Nov. 29, 1955    C. A. WILCOX    2,725,454

RANGE OVEN HEATING APPARATUS

Filed July 13, 1951    3 Sheets-Sheet 1

WITNESSES:
Frank Cristiano
V. W. Novak

INVENTOR
Charles A. Wilcox
BY Ralph Ewall
ATTORNEY

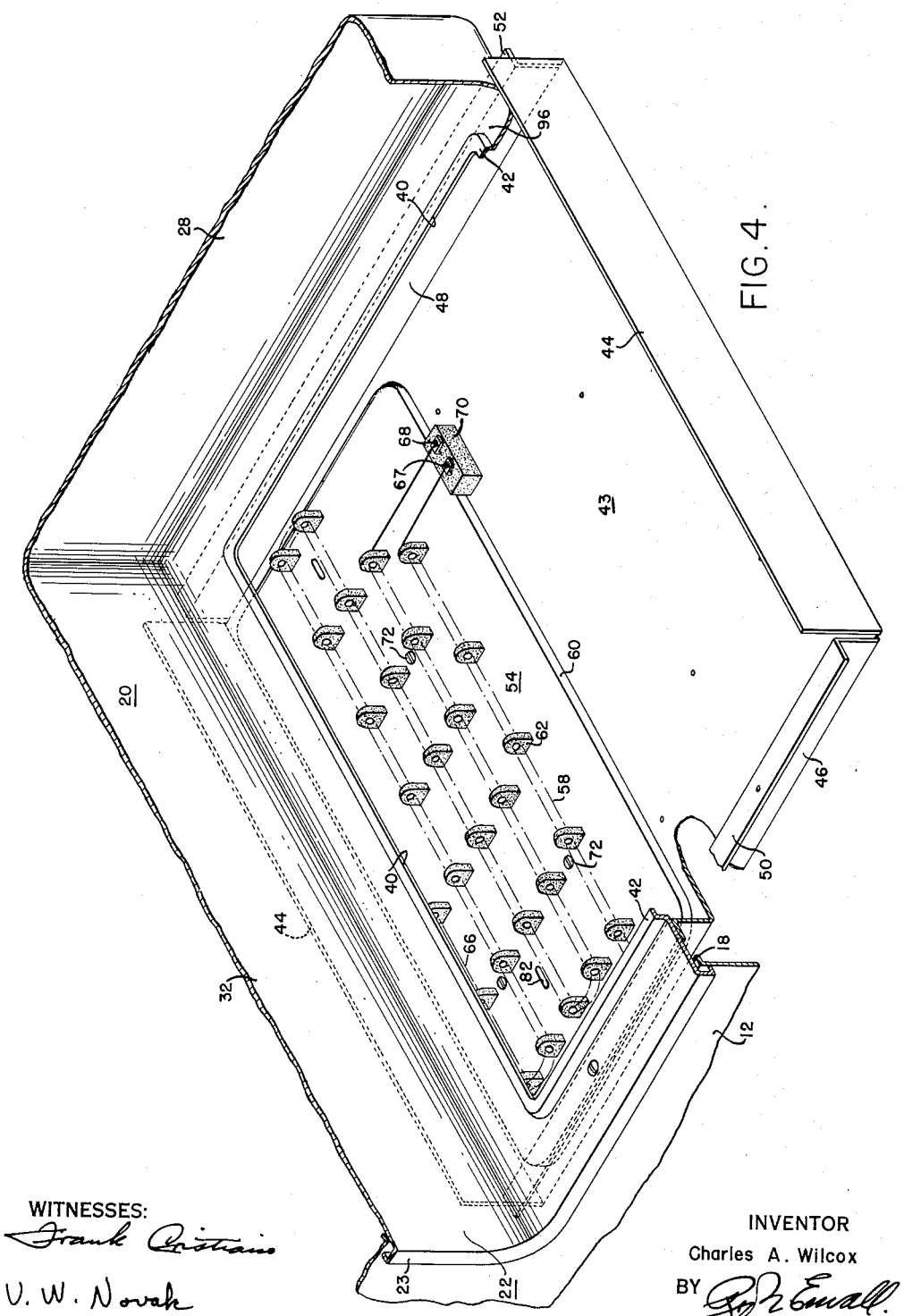

United States Patent Office 2,725,454
Patented Nov. 29, 1955

2,725,454
RANGE OVEN HEATING APPARATUS

Charles A. Wilcox, Mansfield, Ohio, assignor to Westinghouse Electric Corporation, East Pittsburgh, Pa., a corporation of Pennsylvania Application July 13, 1951, Serial No. 236,668

1 Claim. (Cl. 219—35)

This invention relates to an electric baking oven, more particularly to an electric range oven having a heater disposed outside of the oven.

It is desirable to provide an oven having a heater disposed externally of the oven liner and arranged to heat the oven uniformly. Such a structure lends an unencumbered and spacious appearance to the oven and also facilitates cleaning of the oven.

It is an object of the invention to provide an electric oven having an externally disposed heater which, when required for servicing, is accessible for removal through an opening in the oven liner.

It is another object of the invention to provide an externally disposed lower heater for an oven, which heater is extended in heating area adjacent the door to compensate for heat losses and yet is readily removable through an opening in the bottom of the oven liner.

A further object is to provide an oven having an externally disposed bottom heater which is readily removable through an opening in the bottom wall of the oven liner, although being of larger surface area than the opening.

A still further object is to minimize, in an oven having an external bottom heater disposed below an opening in the bottom wall of the liner, spillage dropping onto the heater.

These and other objects are effected by my invention as will be apparent from the following description and claim taken in connection with the accompanying drawings, forming a part of this application, in which:

Fig. 4 is an isometric view of the oven, parts having been cut away or removed for clarity.

Figure 1:
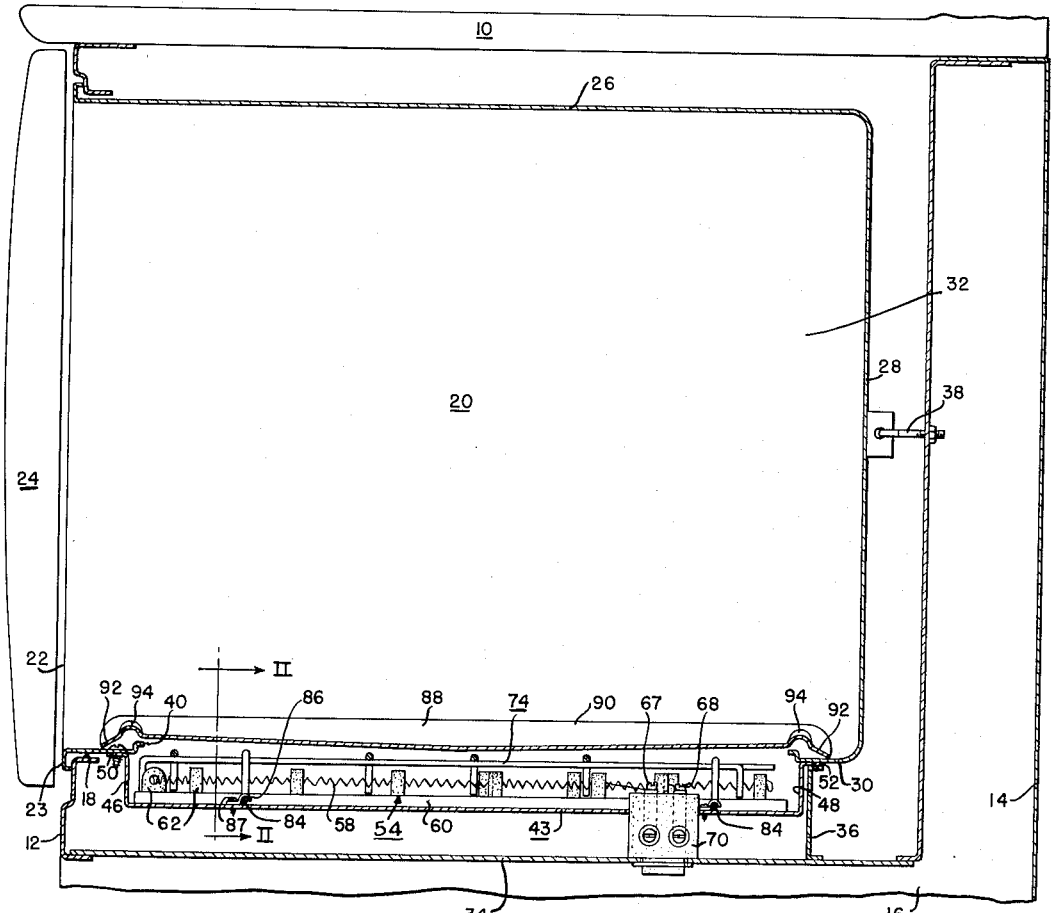
Fig. 1 is a vertical sectional view showing my improved electric oven incorporated in a domestic range.

Referring to the drawings in detail, especially Fig. 1, there is shown a domestic range having a cooking platform 10 supported on a body structure having a front wall 12, a rear wall 14 and side walls 16 (only one shown). The front wall 12 is provided with an opening 18 through which is inserted a substantially cubical oven liner 20 having a front access opening 22 encompassed by a peripheral flange 23 and adapted to be closed by a door 24, as well understood in the art.

The oven liner 20 has a top wall 26, a rear wall 28, a bottom wall 30 and two side walls 32. A horizontal panel 34, disposed below the oven liner, serves as a support for the rear end of the oven liner, there being a channel member 36 acting as a spacer between the two and directly supporting the oven liner. The oven liner is positioned in horizontal direction by abutment of its peripheral flange 23 against the front wall 12 of the body, and is held firmly in position by a clamping bolt 38 disposed at the rear of the oven liner.

The bottom wall 30 of the oven liner is provided with a large rectangular opening 40 surrounded by a continuous peripheral flange 42 disposed upwardly and inwardly. A heater pan 43, disposed below the opening 40 in registry therewith, is provided with a pair of side walls 44 substantially in alignment with the side walls 32 of the liner, and front and rear walls 46 and 48, respectively. The front wall 46 is provided with a flange 50 which is fastened to the oven liner by a plurality of screws, while the rear wall 48 is provided with a flange 52 which is disposed between the channel member 36 and the oven liner.

A pair of heater units, including a left heater 54 and a right heater 56, are supported by the heater pan 43 and, when electrically energized, serve to heat the oven liner 20.

Each of the heaters 54 and 56 has a helically wound bare resistance wire 58 insulatedly supported on a metal support base 60 by a plurality of spaced ceramic insulators 62. As well understood in the art, each of the insulators 62 is provided with an opening through which the resistor wire is threaded. The insulators may be held in the support base in any desired manner, although I prefer to provide a plurality of holes in the support base within which the insulators are individually inserted, prior to assembly of the resistor wire 58. Each insulator 62 is provided with a lower flange 64, whereby it is individually located between the support base 60 and the heater pan 43. The base 60 is substantially rectangular and its longitudinal dimension is slightly larger than the dimension of the opening 40 from front to rear, while its width is substantially smaller than the dimension of the opening from left to right. The ends of the resistor wire 58 are connected to a pair of terminal screws 67 and 68 disposed in a terminal block 70, which is supported on the panel 34 and extends upwardly into the central rear portion of the heater pan 43.

Figure 3:
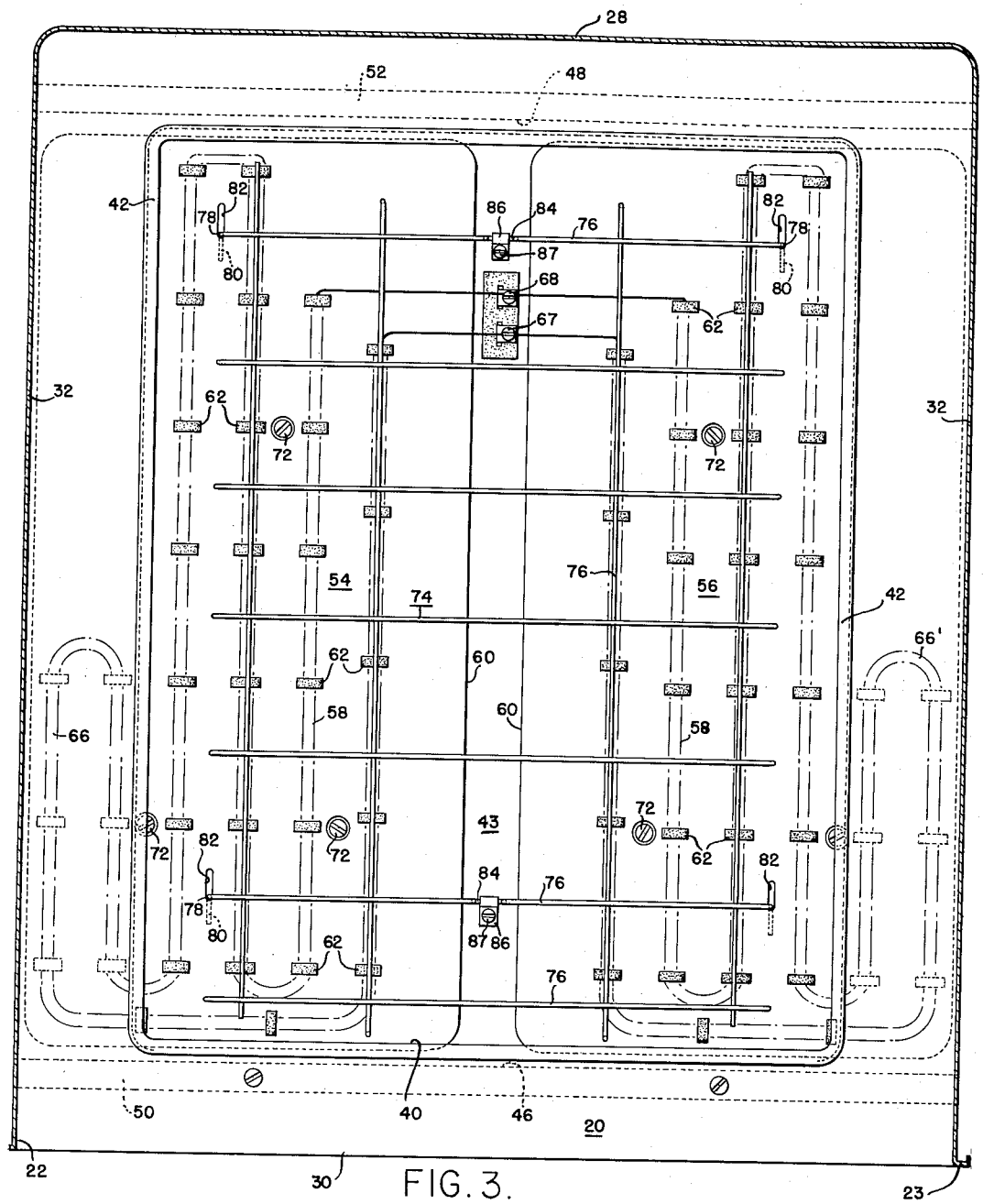
Fig. 3 is a horizontal section taken on line III—III of Fig. 2 but with the tray removed.

As best shown in Fig. 3, the left heater 54 is disposed on the left side of the heater pan 43 and extends laterally beyond the left side of the opening 40, and its resistor wire 58 is arranged in a pattern which provides more heat to the left front corner of the oven liner 20. Accordingly, the resistor wire is extended to the left front side of the heater to provide an extra loop 66.

The right heater 56 is mounted on the right side of the heater pan 43 and its resistor wire 58 is arranged in a heating pattern which is reversed with respect to the resistor wire 58 of the left heater 54 and is provided with an extra loop 66' on its right front side.

The heaters 54 and 56 are separately fastened to the heater pan 43 by a plurality of screws 72.

With the heater arrangement described above, it will be seen that current from a power supply (not shown) will divide at the terminal screws 67 and 68 and transverse the heaters 54 and 56 in a parallel circuit. Other circuit arrangements, such as a series circuit, may be provided, however, as desired.

The heaters operating conjointly from the common terminal block 70, serve all the purposes of a single heater extending transversely substantially beyond the confines of the opening 40 to the side walls 32 of the oven liner, and extending from the front edge of the opening 40 to the rear edge of the same.

A formed wire guard member 74, having a plurality of intersecting horizontal portions 76 disposed above the heaters 54 and 56, is supported in registry with the opening 40 by the heater pan 43. The wire guard member is substantially rectangular in outline and somewhat smaller than the opening 40 to facilitate removal therefrom. The rear horizontal portion 76 is bent downwardly at its ends to provide corner legs 78 for the wire guard member 74. The corner legs 78 are bent forwardly at their ends to provide locking portions 80 which engage appropriate slots 82 provided in the heater support bases 60. The rear portion 76 is bent downwardly and upwardly at its central portion to provide a central leg 84 for the wire guard member. One of the forward horizontal portions 76 is similarly provided with corner legs 78 and a central leg 84. Each of the central legs 84 may be individually attached to the heater pan 43 by a clamp 86 fastened to the heater pan by a screw 87.

A formed sheet metal tray 88 disposed within the oven liner 20 and extending substantially to the side walls 32 and the rear wall 28 of the same, serves to close the opening 40 and acts as a heat radiator. The left and right marginal portions 90 of the tray are bent upwardly while the front and rear marginal portions 92 of the tray are bent downwardly and serve to support the tray on the bottom wall 30 of the oven liner. The tray is further provided with a front and rear rib 94, which ribs cooperate with the left and right marginal portions 90 to retain spillage within the tray and prevent escapement of the spillage to the bottom wall 30 of the liner.

Figure 2:
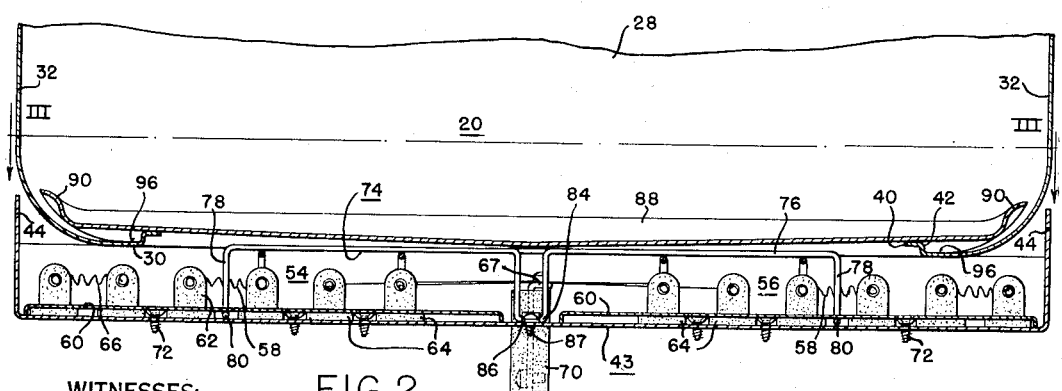
Fig. 2 is a vertical section taken on line II—II of Fig. 1, on a larger scale.

As best shown in Figs. 1 and 2, the opening 40 is above the surface of the bottom wall 30 and is protected against spillage by its peripheral flange 42 which, together with the bottom wall 30, forms a trap 96. Thus, any liquids which may collect on the side walls of the oven liner and drip to the bottom wall of the liner will gather in the trap 96 and will be prevented from entering the heater tray 43, where the intense heat would cause smoking to occur.

The tray 88 effectively closes the opening 40 against the passage of air currents from the heater pan 43 to the oven liner 20, thus substantially eliminating all heat transfer from the heaters 54 and 56 by convection to the liner. The tray is directly exposed to the radiant heat given off by the heaters, however, and serves to transfer heat to the interior of the oven liner chiefly by radiation.

To remove the heaters 54 and 56, in service, the oven door 24 is swung open and the tray 88 is lifted out of the front access opening 22. The wire guard member 74 is first detached from the heater pan 43 by removing the screws 87 holding the clamps 86. The wire guard member is then slid in rearward direction, to disengage its locking portions 80 from the slots 82 in the heater bases 60, and lifted out through the opening 40. The heaters 54 and 56 are now accessible for removal from the heater tray 43 and may be removed successively in any order desired, after first disconnecting the ends of the resistor wires 58 from the terminal screws 67 and 68 and then removing the screws 72 in the support bases 60.

The left heater 54 is first lifted at its right side to clear the terminal block 70, then moved forwardly and to the right to bring the rear edge of its base 60 into registry with the opening 40. The rear end of the heater is then lifted out of the opening, whereupon, the heater is moved rearwardly to bring the forward edge of the base 60 into registry with the opening and the front end is lifted out of the opening. Similarly, the right heater 56 is first lifted at its left side to clear the terminal block 70, then moved forwardly and to the left to bring the rear edge of its base 60 into registry with the opening 40. The rear end of the heater is then lifted out of the opening, whereupon, the heater is moved rearwardly to bring the forward edge of the base 60 into registry with the opening and the front end is lifted out of the opening.

To replace the heaters, the above procedure is reversed.

In the event that liquids spill onto the tray 88, the tray may be lifted out of the oven liner and cleaned at the kitchen sink. Any spillage which has collected in the trap 96 may be mopped up in a dish cloth, at this time, and the bottom wall 30 may then be wiped clean. During such cleaning operations the wire guard member 74 prevents large objects from falling onto the heaters 54 and 56. The wire guard also serves to prevent the tray from striking the heaters during its subsequent replacement. Thus, the insulators 62 and the resistor wires 58 are adequately protected against breakage.

During cooking operations, the interior of the oven liner is uniformly heated by radiation from the tray 88, and localized hot or cold spots caused mainly by convected air currents are practically eliminated. Also, heat losses around the oven door 24 are compensated for by the additional resistor wire loops 66 and 66'.

Cooking performance is greatly improved and the appearance of the oven is materially enhanced, since the heaters 54 and 56 are below the oven liner and are not normally visible. In addition to the foregoing, the useful capacity of the oven liner is substantially increased without altering the size of the oven liner.

While the invention has been shown in but one form, it will be obvious to those skilled in the art that it is not so limited, but is susceptible of various changes and modifications without departing from the spirit thereof.

What I claim is:

In an oven structure, an oven liner having a pair of oppositely disposed side walls, an opening at the bottom and a corner portion connected to the lower portion of each side wall, said cover portions being curved toward each other, a plurality of electrical heaters removably supported beneath said opening in proximity thereto, each of said heaters having an electrical resistor and a support therefor, one of said resistors comprising a portion disposed beneath one of said curved corner portions and another of said resistors comprising a portion disposed beneath the other of said curved corner portions, whereby additional heat is provided for said corner portions and said side walls, said heaters being collectively of larger area than said opening but being individually of smaller area than said opening and being readily removable therethrough individually, and a sheet member for closing said opening, said sheet member serving to radiate heat from said heaters to the interior of said oven liner.

References Cited in the file of this patent

UNITED STATES PATENTS

| | | |
|---|---|---|
| 1,784,201 | Pickup | Dec. 9, 1930 |
| 1,897,879 | Antrim | Feb. 14, 1933 |
| 1,948,402 | Teller et al. | Feb. 20, 1934 |
| 2,367,007 | Cossin | Jan. 9, 1945 |
| 2,392,796 | Berg | Jan. 8, 1946 |